(12) United States Patent
Wu et al.

(10) Patent No.: US 11,417,251 B2
(45) Date of Patent: Aug. 16, 2022

(54) FLEXIBLE CIRCUIT BOARD, DISPLAY PANEL, DISPLAY DEVICE AND TEST METHOD

(71) Applicant: WuHan TianMa Micro-electronics CO., LTD, Wuhan (CN)

(72) Inventors: Han Wu, Wuhan (CN); Houfu Gong, Wuhan (CN); Jun Li, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 243 days.

(21) Appl. No.: 16/730,867

(22) Filed: Dec. 30, 2019

(65) Prior Publication Data

US 2021/0065596 A1 Mar. 4, 2021

(30) Foreign Application Priority Data

Aug. 29, 2019 (CN) .......................... 201910809967.7

(51) Int. Cl.
*G09G 3/00* (2006.01)
*G06F 1/16* (2006.01)

(52) U.S. Cl.
CPC ........... *G09G 3/006* (2013.01); *G06F 1/1626* (2013.01); *G06F 1/1652* (2013.01); *G09G 2330/12* (2013.01)

(58) Field of Classification Search
CPC .. G09G 3/006; G09G 2330/12; G06F 1/1626; G06F 1/1652

(Continued)

(56) References Cited

U.S. PATENT DOCUMENTS

| | | | |
|---|---|---|---|
| 2006/0001819 A1* | 1/2006 | Maeng | G02F 1/1345 349/149 |
| 2006/0017448 A1 | 1/2006 | Chen et al. | |

(Continued)

FOREIGN PATENT DOCUMENTS

| | | |
|---|---|---|
| CN | 1529175 A | 9/2004 |
| CN | 104569605 A | 4/2015 |

(Continued)

OTHER PUBLICATIONS

Second Office Action dated Nov. 2, 2020 for Chinese Patent Application No. 2019108099677, 15 pages.

(Continued)

*Primary Examiner* — Amare Mengistu
*Assistant Examiner* — Gloryvid Figueroa-Gibson
(74) *Attorney, Agent, or Firm* — Christensen O'Connor Johnson Kindness PLLC

(57) ABSTRACT

A flexible circuit board, a display panel, a display device, and a test method are provided. The flexible circuit board includes a flexible circuit board body and a driving chip. First to third dummy terminals are provided on a surface of the flexible circuit board body. Fourth to sixth dummy terminals are electrically connected to a common node in the driving chip. An external sink current output line and an external sink current input line form an external sink current loop through the driving chip. A bonding resistance between the first and fourth dummy terminals is a first bonding resistance, and a bonding resistance between the second and the fifth dummy terminals is a second bonding resistance. The first bonding resistance and the second bonding resistance each are a resistance on the external sink current loop.

16 Claims, 8 Drawing Sheets

(58) Field of Classification Search
USPC .................................................. 324/750.3
See application file for complete search history.

(56) References Cited

U.S. PATENT DOCUMENTS

| | | | |
|---|---|---|---|
| 2015/0162388 A1* | 6/2015 | Kim .................... | G06F 1/1626 |
| | | | 257/40 |
| 2016/0202298 A1* | 7/2016 | Brahma ............... | G01R 27/205 |
| | | | 345/206 |

FOREIGN PATENT DOCUMENTS

| CN | 204348296 U | 5/2015 |
|---|---|---|
| CN | 106658947 A | 5/2017 |
| CN | 107610625 A | 1/2018 |
| CN | 108459441 A | 8/2018 |
| CN | 109521584 A | 3/2019 |
| JP | 2004095872 A | 3/2004 |

OTHER PUBLICATIONS

Office Action dated Apr. 24, 2020, for Chinese Patent Application No. 201910809967.7. (with English translation, 13 pages).

* cited by examiner

… (1)

FLEXIBLE CIRCUIT BOARD, DISPLAY PANEL, DISPLAY DEVICE AND TEST METHOD

CROSS-REFERENCE TO RELATED APPLICATIONS

The present application claims priority to Chinese Patent Application No. 201910809967.7, filed on Aug. 29, 2019, the content of which is incorporated herein by reference in its entirety.

TECHNICAL FIELD

The present disclosure relates to the field of flexible display technologies, and particularly, to a flexible circuit board, a display panel, a display device, and a test method.

BACKGROUND

A display device typically includes a display panel, a flexible circuit board and a mainboard, and the flexible circuit board is bonded with a driving chip. After the driving chip is bonded to the flexible circuit board, it typically performs a test for determining whether the bonding status of the flexible circuit board and the driving chip is suitable for desired functionality. However, test methods in related art can only determine whether the flexible circuit board can work normally. In a condition where a large value of a bonding resistance between the flexible circuit board and the driving chip does not affect the normal working of the flexible circuit board, the bonding status deteriorates after the display device is used for a period of time, which results in the value of the bonding resistance increasing to affect the display performance.

SUMMARY

Embodiments of the present disclosure provide a flexible circuit board, a display panel, a display device, and a test method.

In an aspect, the embodiments of the present disclosure provide a flexible circuit board. In an embodiment, the flexible circuit board includes a flexible circuit board body and a driving chip. A first dummy terminal, a second dummy terminal, and a third dummy terminal are provided on a surface of the flexible circuit board body. The first dummy terminal is electrically connected to an external sink current input line arranged on the flexible circuit board body, the second dummy terminal is electrically connected to a first voltage test line and an external sink current output line that are arranged on the flexible circuit board body, and the third dummy terminal is electrically connected to a second voltage test line arranged on the flexible circuit board body. A fourth dummy terminal, a fifth dummy terminal, and a sixth dummy terminal are provided on a surface of the driving chip and are electrically connected to a common node in the driving chip. The fourth dummy terminal is bonded to the first dummy terminal, the fifth dummy terminal is bonded to the second dummy terminal, and the sixth dummy terminal is bonded to the third dummy terminal. The external sink current input line and the external sink current output line form an external sink current loop through the driving chip. A bonding resistance between the first dummy terminal and the fourth dummy terminal is a first bonding resistance, a bonding resistance between the second dummy terminal and the fifth dummy terminal is a second bonding resistance, and the first bonding resistance and the second bonding resistance each are a resistance on the external sink current loop.

In another aspect, the embodiments of the present disclosure further provide a display panel. The display panel includes a display panel body and the above flexible circuit board. The flexible circuit board is electrically connected to the display panel body.

In another aspect, the embodiments of the present disclosure further provide a display device. The display device includes a mainboard and the above display panel. The flexible circuit board of the display panel is electrically connected to the mainboard.

In another aspect, the embodiments of the present disclosure further provide a test method applied to the above flexible circuit board. The test method includes: sinking a current into the external sink current input line and the external sink current output line in such a manner that the external sink current input line, the first dummy terminal, the fourth dummy terminal, the fifth dummy terminal, the second dummy terminal, and the external sink current output line form a current conduction path, where a magnitude of the sink current on the current conduction path is I; acquiring a voltage difference U between the first voltage test line and the second voltage test line; and acquiring a value of the second bonding resistance R, where R=U/I.

BRIEF DESCRIPTION OF DRAWINGS

In order to illustrate technical solutions of embodiments of the present disclosure, the accompanying drawings used in the embodiments are introduced hereinafter. These drawings illustrate some embodiments of the present disclosure. Based on these drawings, those skilled in the art can also obtain other drawings without paying any creative effort.

DESCRIPTION OF EMBODIMENTS

In order to better understand technical solutions of the present disclosure, the embodiments of the present disclosure are described in details with reference to the drawings. It should be clear that the described embodiments are merely part of the embodiments of the present disclosure rather than all of the embodiments. All other embodiments obtained by those skilled in the art without paying creative effort shall fall into the protection scope of the present disclosure.

The terms used in the embodiments of the present disclosure are merely for the purpose of describing specific embodiments, rather than limiting the present disclosure. The terms "a", "an", "the" and "said" in a singular form in the embodiments of the present disclosure and the attached claims are also intended to include plural forms thereof, unless noted otherwise.

Figure 1:
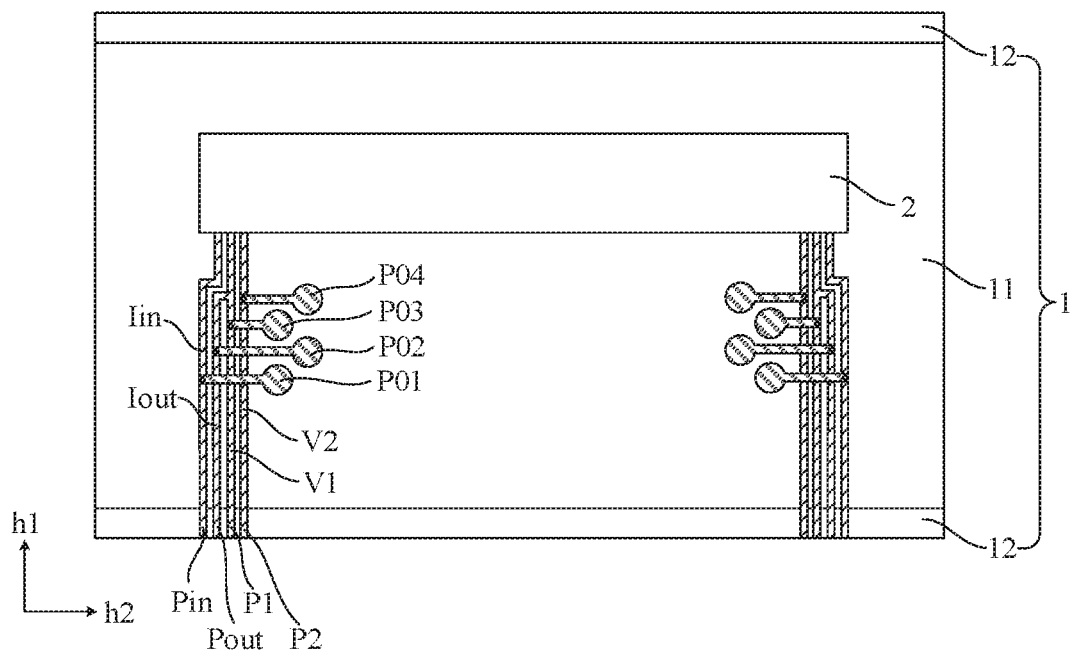
FIG. 1 is a schematic diagram of a flexible circuit board according to some embodiments of the present disclosure.
Figure 2:
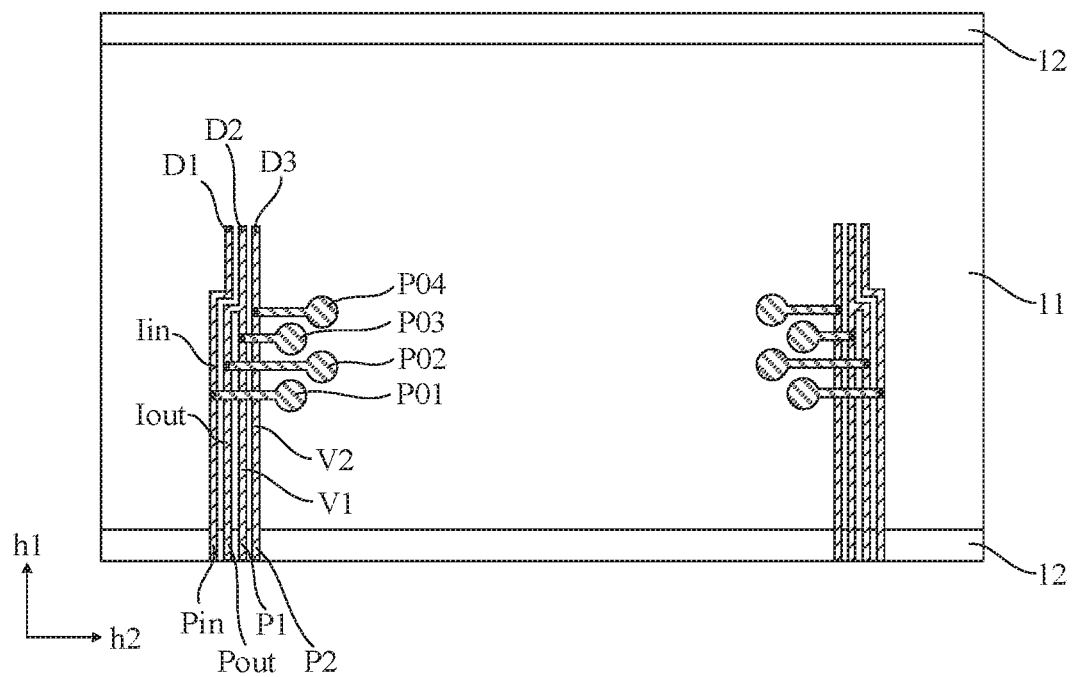
FIG. 2 is a schematic diagram of a flexible circuit board body in FIG. 1, in accordance with an embodiment of the present disclosure.
Figure 3:
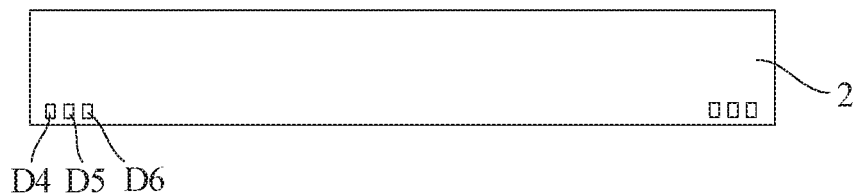
FIG. 3 is a schematic diagram of a driving chip in FIG. 1, in accordance with an embodiment of the present disclosure.
Figure 4:
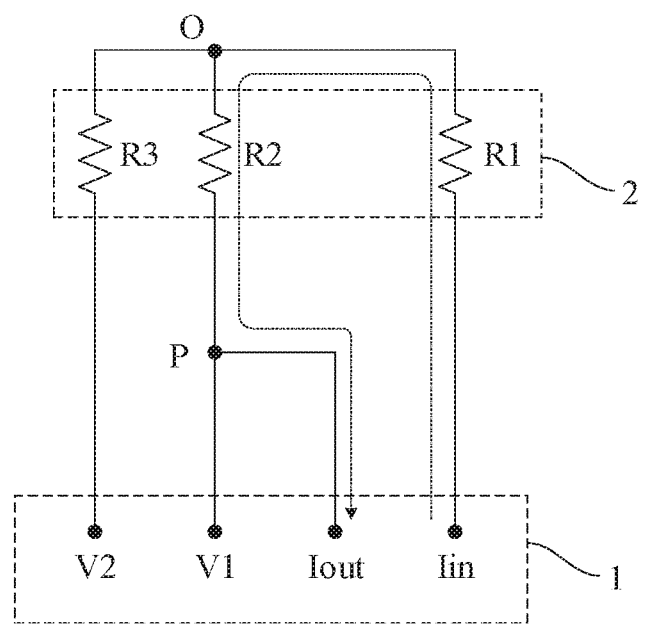
FIG. 4 shows an equivalent circuit of an external sink current loop formed in the flexible circuit board in FIG. 1, in accordance with an embodiment of the present disclosure.

FIG. 1 is a schematic diagram of a flexible circuit board according to some embodiments of the present disclosure. FIG. 2 is a schematic diagram of a flexible circuit board body of the flexible circuit board in FIG. 1. FIG. 3 is a schematic diagram of a driving chip of the flexible circuit board in FIG. 1. FIG. 4 shows an equivalent circuit of an external sink current loop formed in the flexible circuit board in FIG. 1. As shown in FIG. 1, FIG. 2, FIG. 3 and FIG. 4, a flexible circuit board provided by embodiments of the present disclosure includes a flexible circuit board body 1 and a driving chip 2. A first dummy terminal D1, a second dummy terminal D2, and a third dummy terminal D3 are provided on a surface of the flexible circuit board body 1. The first dummy terminal D1 is electrically connected to an external sink current input line Iin arranged on the flexible circuit board body 1. The second dummy terminal D2 is electrically connected to an external sink current output line Iout and a first voltage test line V1 that are arranged on the flexible circuit board body 1. The third dummy terminal D3 is electrically connected to a second voltage test line V2 arranged on the flexible circuit board body 1. A fourth dummy terminal D4, a fifth dummy terminal D5, and a sixth dummy terminal D6 are provided on a surface of the driving chip 2. The fourth dummy terminal D4, the fifth dummy terminal D5, and the sixth dummy terminal D6 are electrically connected to a common node O in the driving chip 2. The fourth dummy terminal D4 is bonded to the first dummy terminal D1, the fifth dummy terminal D5 is bonded to the second dummy terminal D2, and the sixth dummy terminal D6 is bonded to the third dummy terminal D3. The external sink current input line Iin and the external sink current output line Iout form an external sink current loop through the driving chip 2. A bonding resistance between the first dummy terminal D1 and the fourth dummy terminal D4 is a first bonding resistance R1, a bonding resistance between the second dummy terminal D2 and the fifth dummy terminal D5 is a second bonding resistance R2, and the first bonding resistance R1 and the second bonding resistance R2 each are a resistance on the external sink current loop.

In an embodiment, the dummy terminals are different from functional signal terminals arranged on the driving chip 2 and the flexible circuit board body 1, and the dummy terminals are only used for testing and are not used for driving a display panel. The bonding between terminals are used for realizing electrical connection between terminals. The bonding resistance refers to a value of a resistance between the bonded terminals, and is relevant to a bonding status. For example, the better a contact between the bonded terminals is (for example, the larger a contact area between the bonded terminals is), the smaller the value of the bonding resistance is. Conversely, the worse the contact between the bonded terminals is (for example, the smaller the contact area is), the larger the value of the bonding resistance is. While the driving chip 2 and the flexible circuit board body 1 are bonded, the bonding status between the dummy terminals is consistent with a bonding status between functional signal terminals. Therefore, the bonding status between functional signal terminals can be reflected by testing the bonding resistance between the dummy terminals. After the driving chip 2 is bonded to the flexible circuit board body 1, the bonding resistance between the dummy terminals can be tested by sinking an external current. In a process for testing the bonding resistance, a sink input current is provided through the external sink current input line Iin, and the sink current is outputted through the external sink current output line Iout. In FIG. 4, a dotted line with an arrow indicates a flow direction of the current in the external sink current loop. The external sink current I flows from the external sink current input line Iin into the driving chip 2 via the first dummy terminal D1 and the third dummy terminal D3. The bonding resistance formed between the first dummy terminal D1 and the third dummy terminal D3 is the first bonding resistance R1. That is, the external sink current I flows to the node O via the first bonding resistance R1, and then flows to the external sink current output line Iout via the second dummy terminal D2 and the fifth dummy terminal D5 and then is outputted. The bonding resistance between the second dummy terminal D2 and the fifth dummy terminal D5 is the second bonding resistance R2. A node P is a common node of the external sink current output line Iout and the first voltage test line V1 on the flexible circuit board body 1. That is, a flow path of the external sink current I is: Iin→R1→R2→O→R2→P→Iout. In addition, a bonding resistance formed between the third dummy terminal D3 and the sixth dummy terminal D6 is the third bonding terminal R3. While sinking the external current, the voltage value of the first voltage test line V1 and the voltage value on the second voltage test line V2 are measured. For example, the measured voltage value on the first voltage test line V1 is U1, and the measured voltage value on the second voltage test line V2 is U2, where the voltage value on the second voltage test line V2 is the same as the voltage value on the node O. The voltage difference between the first voltage test line V1 and the second voltage test line V2 is U=U2−U1. Since the magnitude of the external sink current I is known, according to Ohm's law, the second bonding resistance R2 formed between the second dummy terminal D2 and the fifth dummy terminal D5 is R=U/I, and R is a value of the bonding resistance of the driving chip 2. Whether the bonding status of the driving chip 2 satisfies a requirement can be determined according to the value of the bonding resistance R, thereby achieving an efficient quality control.

In the flexible circuit board of the embodiments of the present disclosure, both the flexible circuit board body and the driving chip are provided with a corresponding dummy terminal, the dummy terminals arranged on the flexible circuit board body are connected to the external sink current input line, the external sink current output line, and the voltage test line, respectively. After the dummy terminals of the driving chip are bonded to the dummy terminals of the flexible circuit board body, the external current is sunk into the external sink current input line and the external sink current output line, such that the sunk current flows in the external sink current loop through the dummy terminals and the driving chip. Meanwhile, the voltage difference on the external sink current loop is obtained through the voltage test lines, and the bonding resistance of the driving chip can be calculated to determine whether the bonding status of the driving chip satisfies the requirement based on the bonding resistance of the driving chip, thereby achieving efficient quality control. In addition, by sinking the external current, the bonding resistance can be tested more accurately.

Figure 5:
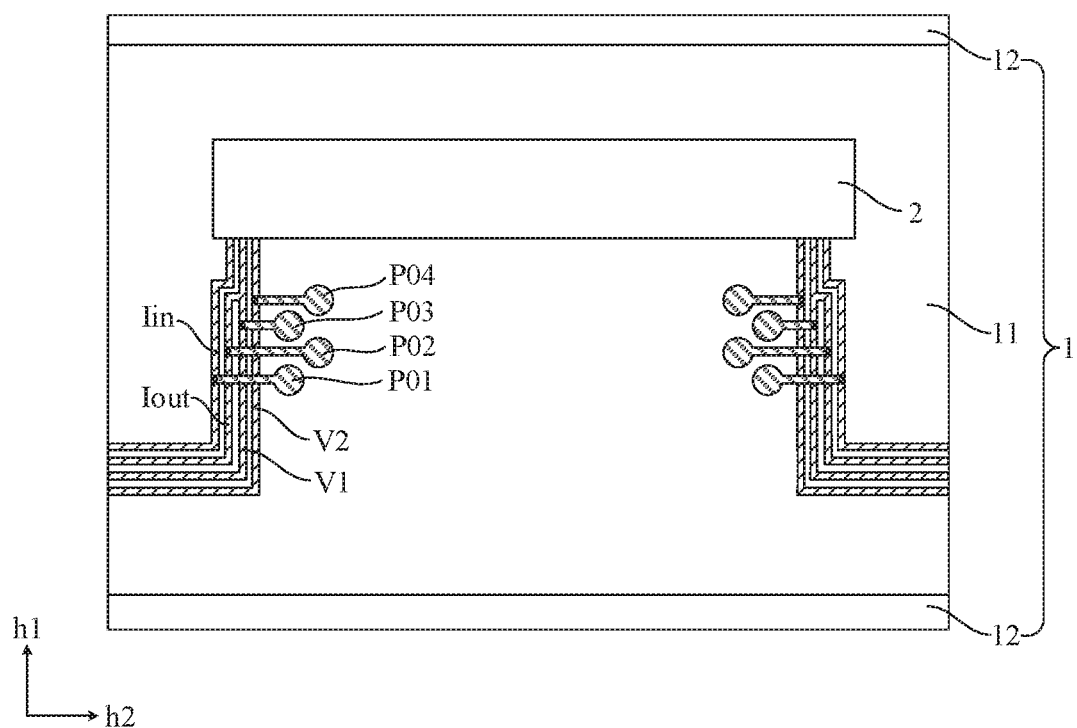
FIG. 5 is a schematic diagram of another flexible circuit board according to some embodiments of the present disclosure.
Figure 6:
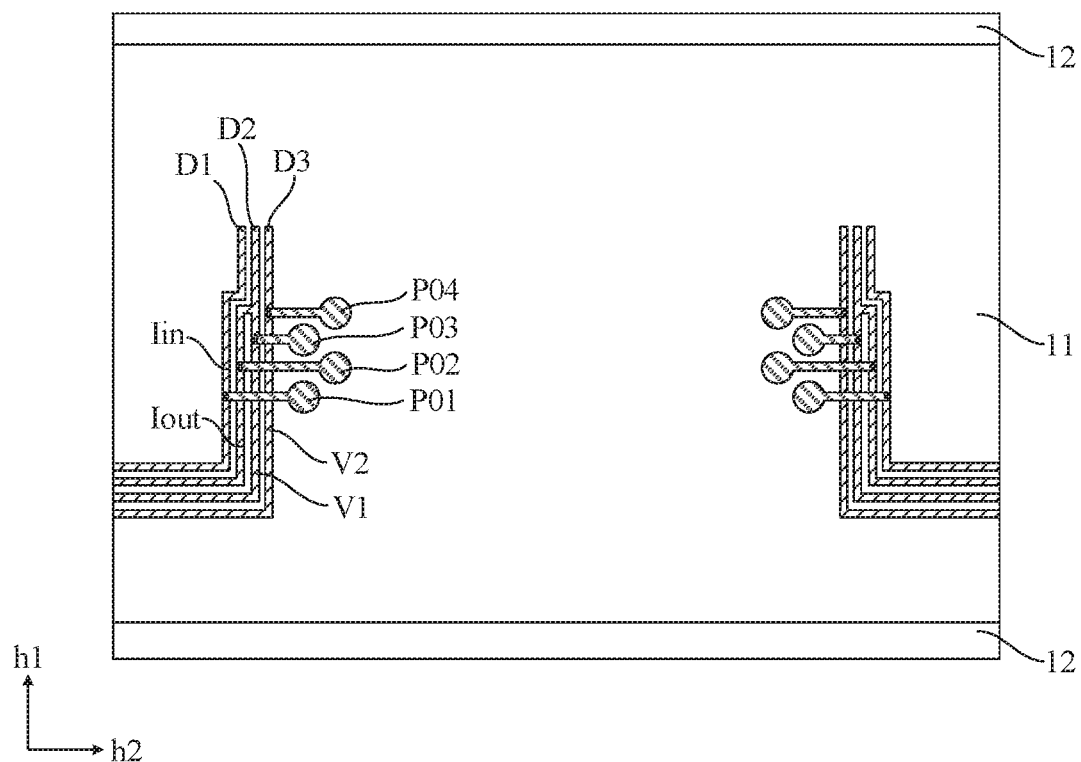
FIG. 6 is a schematic diagram of a flexible circuit board body in FIG. 5, in accordance with an embodiment of the present disclosure.

FIG. 5 is a schematic diagram of another flexible circuit board according to some embodiments of the present disclosure. FIG. 6 is a schematic diagram of the flexible circuit board body in FIG. 5, in accordance with an embodiment of the present disclosure. In an embodiment, as shown in FIG. 5 and FIG. 6, the external sink current input line Iin, the external sink current output line Iout, the first voltage test line V1, and the second voltage test line V2 all extend to and are floating at an edge of the flexible circuit board body 1.

Figure 7:
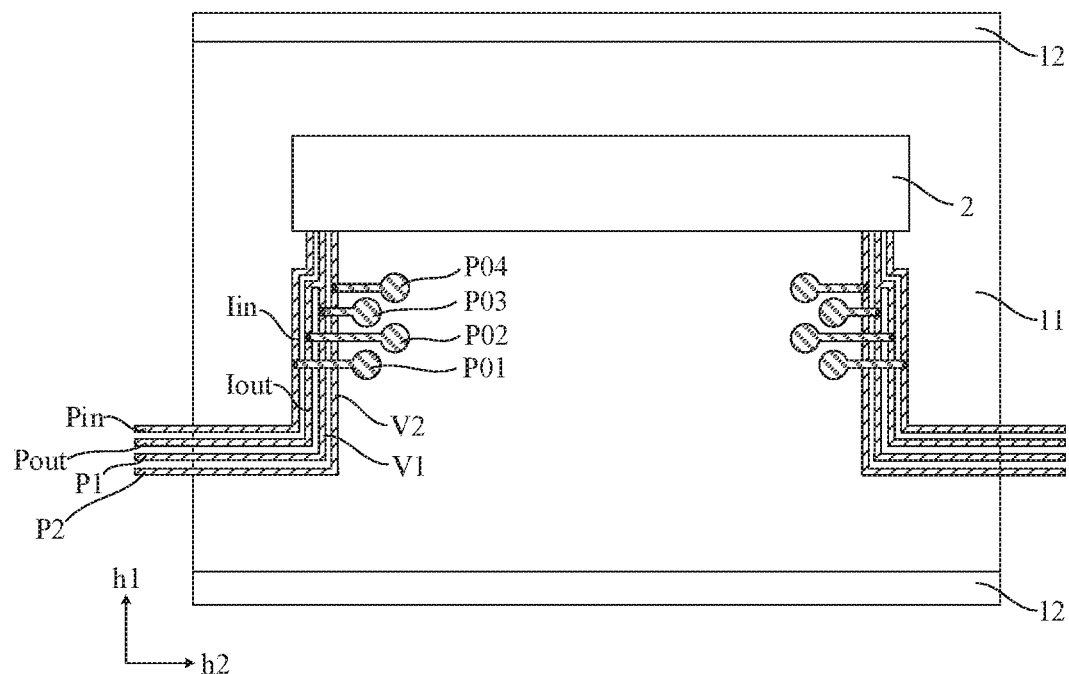
FIG. 7 is a schematic diagram showing an uncut state of the flexible circuit board in FIG. 5, in accordance with an embodiment of the present disclosure.

FIG. 7 is a schematic diagram showing an uncut state of the flexible circuit board in FIG. 5, in accordance with an embodiment of the present disclosure. In an embodiment, as shown in FIG. 5, FIG. 6, and FIG. 7, on the flexible circuit board body 1 shown in FIG. 7, the external sink current input line Iin extends to an external sink current input terminal Pin; the external sink current output line Iout extends to an external sink current output terminal Pout; the first voltage test line V1 extends to a first voltage test terminal P1; and the second voltage test line V2 extends to a second voltage test terminal P2. While measuring the value of the bonding resistance of the driving chip 2, each of the external sink current input terminal Pin, the external sink current output terminal Pout, the first voltage test terminal P1 and the second voltage test terminal P2 contacts an external terminal. In this way, the sunk external current is provided and the voltage value on the first voltage test line V1 and the voltage value on the second voltage test line V2 are obtained, and then the value of the bonding resistance of the driving chip 2 can be obtained by calculation. The test principle is the same as that in the above embodiments, and is not repeated herein. After the test is completed, the flexible circuit board body 1 shown in FIG. 7 is cut, and the flexible circuit board shown in FIG. 5 is obtained after being cut. In the cutting process, the external sink current input line Iin, the external sink current output line Iout, the first voltage test line V1, and the second voltage test line V2 are all cut off, and the terminals used with these signal lines in the test process are removed, such that these signal lines all extend to and are floating at the edge of the flexible circuit board body 1 and thereby the space occupied by these signal lines is reduced.

In one or more embodiments, as shown in FIG. 5, FIG. 6, and FIG. 7, the flexible circuit board body 1 has an encapsulation area 11. In the encapsulation area 11, a protecting layer (not shown in FIG. 5, FIG. 6, and FIG. 7) is provided on the surface of the flexible circuit board body 1. The flexible circuit board further includes a first reserved terminal P01, a second reserved terminal P02, a third reserved terminal P03, and a fourth reserved terminal P04, which are arranged on the surface of the flexible circuit board body 1. The first reserved terminal P01 is electrically connected to the external sink current input line Iin, the second reserved terminal P02 is electrically connected to the external sink current output line Iout, the third reserved terminal P03 is electrically connected to the first voltage test line V1, and the fourth reserved terminal P04 is electrically connected to the second voltage test line V2. The first reserved terminal P01, the second reserved terminal P02, the third reserved terminal P03, and the fourth reserved terminal P04 are arranged in the encapsulation area 11 and are covered by the protecting layer.

In an embodiment, after the manufacturing of the flexible circuit board is complete, the surface of the flexible circuit board body 1 in the encapsulation layer 11 is encapsulated and protected by the protecting layer. Therefore, the reserved terminals are all covered by the protecting layer, and cannot be used for measuring the value of the bonding resistance of the driving chip 2. The testing for the test terminals shown in FIG. 6 can be performed before cutting flexible circuit board. The reserved terminals are used for measuring the value of the bonding resistance of the driving chip 2 after the test terminals are removed. For example, in the using process of the display device on which the flexible circuit board is arranged, it may need to continue to monitor the bonding status of the driving chip 2. The protecting layer covering the reserved terminals in the encapsulation layer 11 can be removed, and each reserved terminal can contact a corresponding external terminal. That is, the first reserved terminal P01 and the second reserved terminal P02 is sunk into an external current, the voltage values on the first voltage test line V1 and the second voltage test line V2 are obtained through the third reserved terminal P03 and the fourth reserved terminal P04, respectively, and then the value of the bonding resistance of the driving chip 2 can be obtained through calculation. The test principle is the same as that in the above embodiments, and is not repeated herein. With the provided reserved terminals, the bonding status of the driving chip 2 can be further tested after the flexible circuit board is manufactured.

In one or more embodiments, as shown in FIG. 5, FIG. 6, and FIG. 7, the encapsulation area 11 has flexible circuit board connecting areas 12 that are arranged at two opposite sides of the encapsulation area 11 in a first direction h1, and a bare connecting terminal (not shown in FIG. 5, FIG. 6, and FIG. 7) is provided in the flexible circuit board connecting area 12. In the encapsulation area 11, the flexible circuit board body 1 has two opposite cutting edges in a second direction h2 that is perpendicular to the first direction h1. The external sink current input line Iin, the external sink current output line Iout, the first voltage test line V1 and the second voltage test line V2 extend to the two cutting edge.

For example, as shown in FIG. 5, FIG. 6 and FIG. 7, functional signal connecting terminals for connecting the display panel is provided in the flexible circuit board connecting area 12 located at a first side (the upper side in FIG. 5, FIG. 6 and FIG. 7) of the encapsulation area 11, and the functional signal connecting terminals for connecting a mainboard is provided in the flexible circuit board connecting area 12 located at a second side (the lower side in FIG. 5, FIG. 6 and FIG. 7) of the encapsulation area 11. In order to ensure a sufficient disposing space for each functional signal connecting terminal, the signal lines for testing extend to the two cutting edges at left and right sides of the encapsulation area 11, such that the functional signal connecting terminals are not affected by the signal lines for testing, which facilitates the layout of the functional signal connecting terminals.

In one or more embodiments, as shown in FIG. 1 and FIG. 2, an external sink current input terminal Pin, an external sink current output terminal Pout, a first voltage test terminal P1 and a second voltage test terminal P2 are provided on the surface of the flexible circuit board body 1. The external sink current input terminal Pin is electrically connected to the external sink current input line Iin. The external sink current output terminal Pout is electrically connected to the external sink current output line Iout. The first voltage test terminal P1 is electrically connected to the first voltage test line V1. The second voltage test terminal P2 is electrically connected to the second voltage test line V2.

In an embodiment, the external sink current input line Iin extends to the external sink current input terminal Pin; the external sink current output line Iout extends to the external sink current output terminal Pout; the first voltage test line V1 extends to the first voltage test terminal P1; and the second voltage test line V2 extends to the second voltage test terminal P2. In the measurement of the value of the bonding resistance of the driving chip 2, each of the external sink current input terminal Pin, the external sink current output terminal Pout, the first voltage test terminal P1 and the second voltage test terminal P2 is in contact with a corresponding external terminal. In this way, the external current is sunk, the voltage values on the first voltage test line V1 and the second voltage test line V2 are obtained, and then the value of the bonding resistance of the driving chip 2 can be obtained through calculation. The test principle is the same as that in the above embodiments, and is not repeated herein.

In one or more embodiments, as shown in FIG. 1 and FIG. 2, the flexible circuit board body 1 has an encapsulation area 11 and a flexible circuit board connecting area 12. A protecting layer (not shown in drawings) is provided on the surface of the flexible circuit board body 1 in the encapsulation area 11. Bare connecting terminals are provided in the flexible circuit board connecting area 12. The external sink current input terminal Pin, the external sink current output terminal Pout, the first voltage test terminal P1, and the second voltage test terminal P2 are all located in the flexible circuit board connecting area 12.

For example, as shown in FIG. 1 and FIG. 2, functional signal connecting terminals (not shown in the drawings) for connecting the display panel is provided in the flexible circuit board connecting area 12 located at the first side of the encapsulation area 11, and functional signal connecting terminals (not shown in the drawings) for connecting the mainboard and the above test terminals including the external sink current input terminal Pin, the external sink current output terminal Pout, the first voltage test terminal P1, and the second voltage test terminal P2 are provided in the flexible circuit board connecting area 12 located at the second side of the encapsulation area 11. After the manufacturing of the flexible circuit board is complete, the surface of the flexible circuit board body 1 in the encapsulation area 11 is encapsulated and protected by the protecting layer, and only the connecting terminals in the flexible circuit board connecting areas 12 are exposed outside the protecting layer. Therefore, in the process of measuring the value of the bonding resistance of the driving chip 2, each of external sink current input terminal Pin, the external sink current output terminal Pout, the first voltage test terminal P1, and the second voltage test terminal P2 is in contact with a corresponding external terminal. In this way, the external current is sunk, the voltage values on the first voltage test line V1 and the second voltage test line V2 are obtained, and then the value of the bonding resistance of the driving chip 2 can be obtained through calculation. The test principle is the same as that in the above embodiments, and is not repeated herein.

In one or more embodiments, as shown in FIG. 1 and FIG. 2, the flexible circuit board further includes a reserved terminal P01, a reserved terminal P02, a third reserved terminal P03, and a fourth reserved terminal P04, which are arranged on the surface of the flexible circuit board body 1. The first reserved terminal P01 is electrically connected to the external sink current input line Iin. The second reserved terminal P02 is electrically connected to the external sink current output line Iout. The third reserved terminal P03 is electrically connected to the first voltage test line V1. The fourth reserved terminal P04 is electrically connected to the second voltage test line V2. The first reserved terminal P01, the second reserved terminal P02, the third reserved terminal P03, and the fourth reserved terminal P04 are located in the encapsulation area 11 and are covered by the protecting layer.

In an embodiment, after the manufacturing of the flexible circuit board is complete, the surface of the flexible circuit board body 1 in the encapsulation layer 11 is encapsulated and protected by the protecting layer. Therefore, the reserved terminals are all covered by the protecting layer, and the measurement of the value of the bonding resistance of the driving chip 2 cannot be performed with the reserved terminals and needs the test terminals in the flexible circuit board connecting areas 12. After the testing is finished, the flexible circuit board can be bonded to the display panel via the functional signal connecting terminals in the flexible circuit board connecting area 12 at the first side, and can be bonded to the mainboard via the functional signal connecting terminals in the flexible circuit board connecting area 12 at the second side.

In one or more embodiments, the flexible circuit board can be connected to the mainboard through another flexible circuit board. After the flexible circuit board in FIG. 1 is bonded to the display panel and the mainboard, the testing cannot be performed with the test terminals in the flexible circuit board connecting areas 12. When it needs to further monitor the bonding status of the driving chip 2, the protecting layer covering the reserved terminals in the encapsulation layer is removed, and each reserved terminal contact to a corresponding external terminal. That is, an external current is sunk via the first reserved terminal P01 and the second reserved terminal P02; the voltage values on the first voltage test line V1 and the second voltage test line V2 are obtained through the third reserved terminal P03 and the fourth reserved terminal P04, respectively; and then the value of the bonding resistance of the driving chip 2 can be obtained through calculation. The test principle is the same as that in the above embodiments, and is not repeated herein. With the reserved terminals, the bonding status of the driving chip 2 can be further tested after the flexible circuit board is connected to the display panel and the mainboard.

In one or more embodiments, as shown in FIG. 1 and FIG. 5, the flexible circuit board can have two sets of components, each set of components includes test signal lines and test terminals, one set of components is disposed at the left side of the flexible circuit board, and the other set of components is disposed at the right side of the flexible circuit board, such that the left-side bonding status and the right-side bonding status of the driving chip 2 can be tested.

Figure 8:
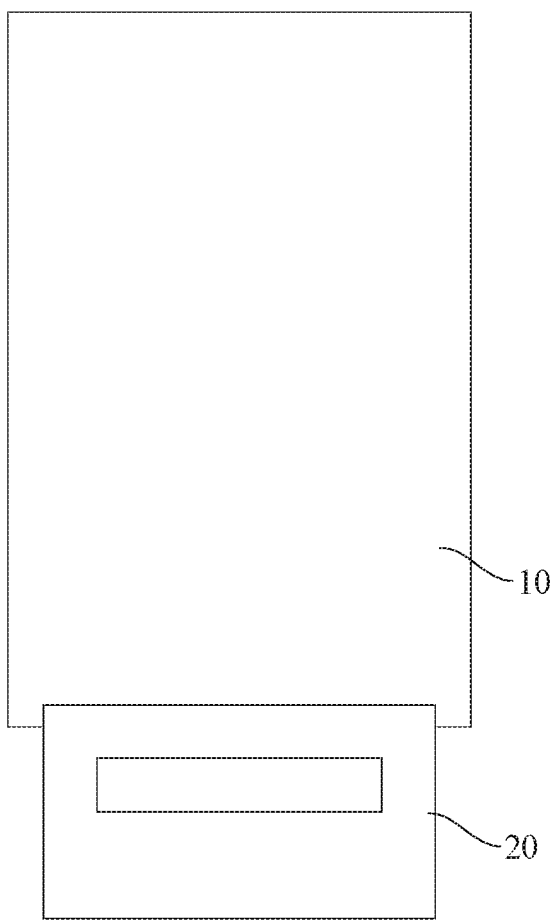
FIG. 8 is a schematic diagram of a display panel according to some embodiments of the present disclosure.

FIG. 8 is a schematic diagram of a display panel according to some embodiments of the present disclosure. As shown in FIG. 8, a display panel provided by the embodiments of the present disclosure includes a display panel body 10 and a flexible circuit board 20 described above, and the flexible circuit board 20 is electrically connected to the display panel body 10. The structure and working principle of the flexible circuit board 20 are the same as those in the above embodiments, and are not repeated herein.

Figure 9:
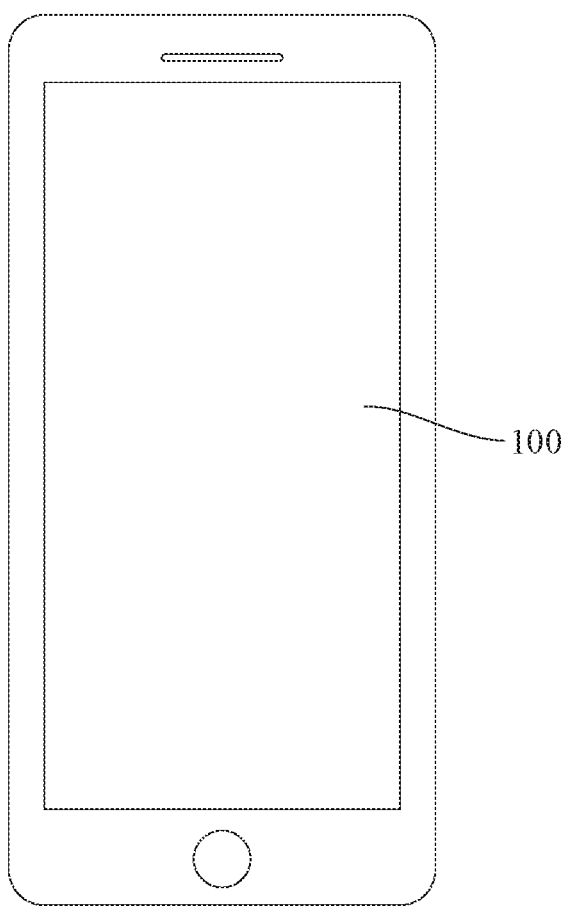
FIG. 9 is a schematic diagram of a display device according to some embodiments of the present disclosure.

FIG. 9 is a schematic diagram of a display device according to some embodiments of the present disclosure. As shown in FIG. 9, a display device provided by the embodiments of the present disclosure includes a mainboard (not shown in FIG. 9) and a display panel 100 described above. The flexible circuit board of the display panel 100 is electrically connected to the mainboard.

The structure of the display panel 100 is the same as that in the above embodiments, and is not repeated herein. The display device can be any electronic device with a display function, for example, a touch display screen, a mobile phone, a tablet computer, a notebook computer, a television, or the like.

As shown in FIG. 1 to FIG. 7, the embodiments of the present disclosure further provide a test method applied to the above flexible circuit board. The test method includes:

sinking a sink current into the external sink current input line Iin and the external sink current output line Iout, such that the external sink current input line Iin, the first dummy terminal D1, the fourth dummy terminal D4, the fifth dummy terminal D5, the second dummy terminal D2, and the external sink current output line Iout form a current conduction path (that is, the external sink current loop in the above embodiments), where a magnitude of the sink current on the current conduction path is I; acquiring a voltage difference U between the first voltage test line V1 and the second voltage test line V2; and acquiring a value of the bonding resistance R between the second dummy terminal D2 and the fifth dummy terminal D5, that is, the value of the resistance R of the second bonding resistance R2, where R=U/I. The process and the principle of the test method have been described in detail in the above embodiments, and are not repeated herein.

The above are merely exemplary embodiments of the present disclosure and do not intend to limit the present disclosure. Any modifications, equivalent substitutions, improvements, etc., which are made within the spirit and principles of the present application, should be included in the protection scope of the present application.

Finally, it should be noted that the above embodiments are only for explaining the technical solutions of the present disclosure, and are not for limiting the disclosure. Although the present disclosure has been described in detail with reference to the foregoing embodiments, those skilled in the art should understand that the technical solutions described in the foregoing embodiments can be modified, or some or all of the technical features can be equivalently replaced. Such modifications or equivalent alternations also fall into the scope of the technical solutions without deviating from the substance of corresponding technical solutions of the embodiments of the present application.

What is claimed is:

1. A flexible circuit board, comprising:
    a flexible circuit board body, wherein a first dummy terminal, a second dummy terminal, and a third dummy terminal are provided on a surface of the flexible circuit board body, wherein the first dummy terminal is electrically connected to an external sink current input line arranged on the flexible circuit board body, the second dummy terminal is electrically connected to a first voltage test line and an external sink current output line that are arranged on the flexible circuit board body, and the third dummy terminal is electrically, mechanically, and directly connected to a second voltage test line arranged on the flexible circuit board body and mechanically independent from the external sink current input line; and
    a driving chip, wherein a fourth dummy terminal, a fifth dummy terminal, and a sixth dummy terminal are provided on a surface of the driving chip and are electrically connected to a common node in the driving chip, the fourth dummy terminal is bonded to the first dummy terminal, the fifth dummy terminal is bonded to the second dummy terminal, the sixth dummy terminal is bonded to the third dummy terminal;
    wherein the external sink current input line and the external sink current output line form an external sink current loop through the driving chip, a bonding resistance between the first dummy terminal and the fourth dummy terminal is a first bonding resistance, a bonding resistance between the second dummy terminal and the fifth dummy terminal is a second bonding resistance, and the first bonding resistance and the second bonding resistance each are a resistance on the external sink current loop; and
    wherein, in a direction along which the driving chip and the flexible circuit board body are stacked, a projection of the driving chip on the flexible circuit board body, a projection of the fourth dummy terminal on the flexible circuit board body, a projection of the fifth dummy terminal on the flexible circuit board body, and a projection of the sixth dummy terminal on the flexible circuit board body are located in the flexible circuit board body.

2. The flexible circuit board according to claim 1, wherein the external sink current input line, the external sink current output line, the first voltage test line, and the second voltage test line extend to and are floating at an edge of the flexible circuit board body.

3. The flexible circuit board according to claim 2, wherein the flexible circuit board body has an encapsulation area in which a protecting layer is provided on the surface of the flexible circuit board body;
    wherein the flexible circuit board further comprises a first reserved terminal, a second reserved terminal, a third reserved terminal, and a fourth reserved terminal that are arranged on the surface of the flexible circuit board body, wherein the first reserved terminal is electrically connected to the external sink current input line, the second reserved terminal is electrically connected to the external sink current output line, the third reserved terminal is electrically connected to the first voltage test line, and the fourth reserved terminal is electrically connected to the second voltage test line; and
    wherein the first reserved terminal, the second reserved terminal, the third reserved terminal, and the fourth reserved terminal are arranged in the encapsulation area and are covered by the protecting layer.

4. The flexible circuit board according to claim 3, wherein the flexible circuit board body further comprises flexible circuit board connecting areas located at two opposite sides of the encapsulation area in a first direction, and a bare connecting terminal is provided in one of the flexible circuit board connecting areas; and
    wherein in the encapsulation area, the flexible circuit board body includes two opposite cutting edges in a second direction, the second direction is perpendicular to the first direction, and the external sink current input line, each of the external sink current output line, the first voltage test line and the second voltage test line extends to one of the two opposite cutting edges.

5. The flexible circuit board according to claim 1, wherein an external sink current input terminal, an external sink current output terminal, a first voltage test terminal, and a second voltage test terminal are provided on the surface of the flexible circuit board body;
    wherein the external sink current input terminal is electrically connected to the external sink current input line, the external sink current output terminal is electrically connected to the external sink current output line, the first voltage test terminal is electrically connected to the first voltage test line, and the second voltage test terminal is electrically connected to the second voltage test line.

6. The flexible circuit board according to claim 5, wherein the flexible circuit board body has an encapsulation area and a flexible circuit board connecting area, wherein a protecting layer is provided on the surface of the flexible circuit board body in the encapsulation area; a bare connecting terminal is provided in the flexible circuit board connecting area; and the external sink current input terminal, the external sink current output terminal, the first voltage test terminal, and the second voltage test terminal are located in the flexible circuit board connecting area.

7. The flexible circuit board according to claim 6, further comprising a first reserved terminal, a second reserved terminal, a third reserved terminal, and a fourth reserved terminal that are located on the surface of the flexible circuit board body,
wherein the first reserved terminal is electrically connected to the external sink current input line, the second reserved terminal is electrically connected to the external sink current output line, the third reserved terminal is electrically connected to the first voltage test line, and the fourth reserved terminal is electrically connected to the second voltage test line; and
wherein the first reserved terminal, the second reserved terminal, the third reserved terminal, and the fourth reserved terminal are located in the encapsulation area and are covered by the protecting layer.

8. A display panel, comprising a display panel body and the flexible circuit board according to claim 1, wherein the flexible circuit board is electrically connected to the display panel body.

9. A display device, comprising a mainboard and the display panel according to claim 8, wherein the flexible circuit board of the display panel is electrically connected to the mainboard.

10. A test method, applied to a flexible circuit board, the flexible circuit board comprising:
a flexible circuit board body, wherein a first dummy terminal, a second dummy terminal, and a third dummy terminal are provided on a surface of the flexible circuit board body, wherein the first dummy terminal is electrically connected to an external sink current input line arranged on the flexible circuit board body, the second dummy terminal is electrically connected to a first voltage test line and an external sink current output line that are arranged on the flexible circuit board body, and the third dummy terminal is electrically, mechanically, and directly connected to a second voltage test line arranged on the flexible circuit board body and mechanically independent from the external sink current input line; and
a driving chip, wherein a fourth dummy terminal, a fifth dummy terminal, and a sixth dummy terminal are provided on a surface of the driving chip and are electrically connected to a common node in the driving chip, the fourth dummy terminal is bonded to the first dummy terminal, the fifth dummy terminal is bonded to the second dummy terminal, the sixth dummy terminal is bonded to the third dummy terminal;
wherein the external sink current input line and the external sink current output line form an external sink current loop through the driving chip, a bonding resistance between the first dummy terminal and the fourth dummy terminal is a first bonding resistance, a bonding resistance between the second dummy terminal and the fifth dummy terminal is a second bonding resistance, and the first bonding resistance and the second bonding resistance each are a resistance on the external sink current loop;
wherein, in a direction along which the driving chip and the flexible circuit board body are stacked, a projection of the driving chip on the flexible circuit board body, a projection of the fourth dummy terminal on the flexible circuit board body, a projection of the fifth dummy terminal on the flexible circuit board body, and a projection of the sixth dummy terminal on the flexible circuit board body are located in the flexible circuit board body; and
wherein the test method comprises:
sinking a current into the external sink current input line and the external sink current output line in such a manner that the external sink current input line, the first dummy terminal, the fourth dummy terminal, the fifth dummy terminal, the second dummy terminal, and the external sink current output line form a current conduction path, wherein a magnitude of the sunk current on the current conduction path is I;
acquiring a voltage difference U between the first voltage test line and the second voltage test line; and
acquiring a value of the second bonding resistance R, wherein R=U/I.

11. The test method according to claim 10, wherein the external sink current input line, the external sink current output line, the first voltage test line, and the second voltage test line extend to and are floating at an edge of the flexible circuit board body.

12. The test method according to claim 11, wherein the flexible circuit board body has an encapsulation area in which a protecting layer is provided on the surface of the flexible circuit board body;
wherein the flexible circuit board further comprises a first reserved terminal, a second reserved terminal, a third reserved terminal, and a fourth reserved terminal that are arranged on the surface of the flexible circuit board body, wherein the first reserved terminal is electrically connected to the external sink current input line, the second reserved terminal is electrically connected to the external sink current output line, the third reserved terminal is electrically connected to the first voltage test line, and the fourth reserved terminal is electrically connected to the second voltage test line; and
wherein the first reserved terminal, the second reserved terminal, the third reserved terminal, and the fourth reserved terminal are arranged in the encapsulation area and are covered by the protecting layer.

13. The test method according to claim 12, wherein the flexible circuit board body further comprises flexible circuit board connecting areas located at two opposite sides of the encapsulation area in a first direction, and a bare connecting terminal is provided in one of the flexible circuit board connecting areas; and
wherein in the encapsulation area, the flexible circuit board body includes two opposite cutting edges in a second direction, the second direction is perpendicular to the first direction, and the external sink current input line, each of the external sink current output line, the first voltage test line and the second voltage test line extends to one of the two opposite cutting edges.

14. The test method according to claim 10, wherein an external sink current input terminal, an external sink current output terminal, a first voltage test terminal, and a second voltage test terminal are provided on the surface of the flexible circuit board body;
wherein the external sink current input terminal is electrically connected to the external sink current input line, the external sink current output terminal is electrically connected to the external sink current output line, the first voltage test terminal is electrically connected to the first voltage test line, and the second voltage test terminal is electrically connected to the second voltage test line.

15. The test method according to claim 14, wherein the flexible circuit board body has an encapsulation area and a flexible circuit board connecting area, wherein a protecting layer is provided on the surface of the flexible circuit board body in the encapsulation area; a bare connecting terminal is provided in the flexible circuit board connecting area; and the external sink current input terminal, the external sink current output terminal, the first voltage test terminal, and the second voltage test terminal are located in the flexible circuit board connecting area.

16. The test method according to claim 15, wherein the flexible circuit board further comprises a first reserved terminal, a second reserved terminal, a third reserved terminal, and a fourth reserved terminal that are located on the surface of the flexible circuit board body, wherein the first reserved terminal is electrically connected to the external sink current input line, the second reserved terminal is electrically connected to the external sink current output line, the third reserved terminal is electrically connected to the first voltage test line, and the fourth reserved terminal is electrically connected to the second voltage test line; and wherein the first reserved terminal, the second reserved terminal, the third reserved terminal, and the fourth reserved terminal are located in the encapsulation area and are covered by the protecting layer.

* * * * *